(12) United States Patent
Hashimoto et al.

(10) Patent No.: US 8,835,064 B2
(45) Date of Patent: Sep. 16, 2014

(54) FUEL BATTERY

(75) Inventors: Keiji Hashimoto, Kariya (JP); Kousuke Kawajiri, Kariya (JP); Satoshi Futami, Kariya (JP)

(73) Assignee: Toyota Shatai Kabushiki Kaisha, Kariya-Shi, Aichi-Ken (JP)

( * ) Notice: Subject to any disclaimer, the term of this patent is extended or adjusted under 35 U.S.C. 154(b) by 405 days.

(21) Appl. No.: 13/146,799

(22) PCT Filed: Mar. 31, 2009

(86) PCT No.: PCT/JP2009/056692
§ 371 (c)(1),
(2), (4) Date: Jul. 28, 2011

(87) PCT Pub. No.: WO2010/113277
PCT Pub. Date: Oct. 7, 2010

(65) Prior Publication Data
US 2012/0009489 A1   Jan. 12, 2012

(30) Foreign Application Priority Data
Mar. 31, 2009   (WO) .................. PCT/JP2009/056692

(51) Int. Cl.
*H01M 8/06* (2006.01)
*H01M 8/10* (2006.01)
*H01M 8/02* (2006.01)
*H01M 8/24* (2006.01)
*H01M 8/04* (2006.01)

(52) U.S. Cl.
CPC ........ *H01M 8/04291* (2013.01); *H01M 8/1002* (2013.01); *H01M 8/0241* (2013.01); *H01M 8/241* (2013.01); *Y02E 60/521* (2013.01); *H01M 8/0247* (2013.01)
USPC ........................................................ 429/414

(58) Field of Classification Search
CPC ...................... H01M 8/04291; H01M 8/04179
USPC .......................................................... 429/414
See application file for complete search history.

(56) References Cited

U.S. PATENT DOCUMENTS

2007/0196711 A1   8/2007   Takeguchi et al.

FOREIGN PATENT DOCUMENTS

| JP | 10-172586 A | 6/1998 |
|---|---|---|
| JP | 2005-158670 A | 6/2005 |
| JP | 2006-004803 A | 1/2006 |
| JP | 2006-079982 A | 3/2006 |
| JP | 2006-269160 A | 10/2006 |
| JP | 2007-027055 A | 2/2007 |
| JP | 2007-059328 A | 3/2007 |
| JP | 2007-087768 A | 4/2007 |
| JP | 2007-311089 A | 11/2007 |
| JP | 2008-117786 A | 5/2008 |

OTHER PUBLICATIONS

International Search Report for PCT/JP2009/056692.
International Preliminary Report on Patentability for PCT/JP2009/056692.

*Primary Examiner* — Nicholas P D'Aniello
(74) *Attorney, Agent, or Firm* — Caesar, Rivise, Bernstein, Cohen & Pokotilow, Ltd.

(57) ABSTRACT

An electrode structure 15 is accommodated in a joint portion of frames 13 and 14. A first gas diffusion layer 19 and a first gas passage forming member 21 are laid on a first surface of the electrode structure 15, and a second gas diffusion layer 20 and a second gas passage forming member 22 are laid on a second surface of the electrode structure 15. A separator 23 is joined to surfaces of the frame 13 and the gas passage forming member 21, and a separator 24 is joined to surfaces of the frame 14 and the gas passage forming member 22. A porous layer 26 having continuous pores is located between the gas passage forming member 22 and the separator 24. A drainage promoting member 30 formed of a porous material having continuous pores is provided to communicate with a downstream end of a second gas passage T2 of the second gas passage forming member 22 and to communicate with a downstream end of the continuous pores of the porous layer 26. Generated water that has been drawn into the porous layer 26 from the second gas passage T2 by capillary action flows downstream by surface tension of water, and is then drawn into the drainage promoting member 30. The water drawn in by the drainage promoting member 30 is discharged into a discharging passage by fluid pressure of oxidation off-gas that flows from the second gas passage T2 into the continuous pores of the drainage promoting member 30. Accordingly, a fuel battery is provided in which generated water is prevented from remaining in the second gas passage T2 of the cathode side second gas passage forming member 22, and it is possible to prevent the power generation performance from being lowered by insufficient supply of oxidation gas to the electrode structure 15.

3 Claims, 7 Drawing Sheets

FUEL BATTERY

FIELD OF THE INVENTION

The present invention relates to a fuel battery that is mounted, for example, on an electric car.

BACKGROUND OF THE INVENTION

Typically, a fuel battery has a cell stack formed by a number of power generation cells stacked together. With reference to FIGS. 7 to 10, a prior art power generation cell will be described. As shown in FIG. 7, a pair of frames 13, 14 are connected to each other, and an electrode structure 15 is installed at the joint portion of the frames 13, 14. The electrode structure 15 is formed by a solid electrolyte membrane 16, an electrode catalyst layer 17 on the anode side, and an electrode catalyst layer 18 on the cathode side. The outer periphery of the solid electrolyte membrane 16 is held between the frames 13, 14. The anode-side electrode catalyst layer 17 is laid on the upper surface of the electrolyte membrane 16, and the cathode-side electrode catalyst layer 18 is laid on the lower surface of the electrolyte membrane 16. An anode-side gas diffusion layer 19 is laid on the upper surface of the electrode catalyst layer 17, and a cathode-side gas diffusion layer 20 is laid on the lower surface of the electrode catalyst layer 18. Further, an anode-side gas passage forming member 21 is laid on the upper surface of the gas diffusion layer 19, and a cathode-side gas passage forming member 22 is laid on the lower surface of the gas diffusion layer 20. A flat plate-like separator 23 is joined to the upper surface of the gas passage forming member 21, and a flat plate-like separator 24 is joined to the lower surface of the gas passage forming member 22.

The solid electrolyte membrane 16 is formed of a fluoropolymer film. As shown in FIG. 8, the electrode catalyst layers 17, 18 each have granular carbon particles 51 supporting a platinum catalyst, and a great number of platinum (Pt) catalyst particles 52 adhere to the surface of each carbon particle 51. The electrode catalyst layers 17, 18 are bonded to the solid electrolyte membrane 16 by paste for forming an electrode catalyst layer. The catalyst particles 52 serving as a catalyst increase the power generation efficiency when power is generated by the fuel battery. The gas diffusion layers 19, 20 are formed of carbon paper. As shown in FIG. 9, the gas passage forming member 21 (22) is formed of a metal lath, which has a great number of hexagonal ring portions 21a (22a) arranged alternately. Each ring portion 21a (22a) has a through hole 21b (22b). Fuel gas (oxidation gas) flows through gas passages formed by the ring portions 21a (22a) and the through holes 21b (22b). FIG. 9 is an enlarged view showing a part of the gas passage forming member 21, 22.

As shown in FIG. 7, the frames 13, 14 form a supply passage M1 and a discharging passage M2 for fuel gas. The fuel gas supply passage M1 is used for supplying hydrogen gas, which serves as fuel gas, to the gas passages of the anode-side gas passage forming member 21. The fuel gas discharging passage M2 is used for discharging fuel gas that has passed through the gas passages of the gas passage forming member 21, or fuel off-gas, to the outside. Also, the frames 13, 14 form a supply passage and a discharging passage for oxidation gas. The oxidation gas supply passage is located at a position corresponding to the back side of the sheet of FIG. 7, and is used for supplying air serving as oxidation gas to the gas passages of the cathode-side gas passage forming member 22. The oxidation gas discharging passage is located at a position corresponding to the front side of the sheet of FIG. 7, and is used for discharging oxidation gas that has passed through the gas passages of the gas passage forming member 22, or oxidation off-gas, to the outside.

Hydrogen gas from a hydrogen gas supply source (not shown) is supplied to the gas passage forming member 21 through the fuel gas supply passage M1 along a gas flow direction P indicated by an arrow in FIG. 7, and air is supplied to the gas passage forming member 22 from an air supply source (not shown). Accordingly, power is generated through an electrochemical reaction in the power generation cell. Specifically, hydrogen gas ($H_2$) supplied to the anode-side gas passage forming member 21 flows into the electrode catalyst layer 17 through the gas diffusion layer 19. In the electrode catalyst layer 17, hydrogen ($H_2$) is broken down into hydrogen ions ($H^+$) and electrons ($e^-$) as shown by chemical formula (1), and the potential of the electrode catalyst layer 17 becomes zero volts, or the standard electrode potential, as known in the art.

$$H_2 \rightarrow 2H^+ + 2e^- \tag{1}$$

Hydrogen ions ($H^+$) obtained through the above reaction reaches the cathode-side electrode catalyst layer 18 from the anode-side electrode catalyst layer 17 through the solid electrolyte membrane 16. Oxygen ($O_2$) in the air supplied to the electrode catalyst layer 18 from the gas passage forming member 22 chemically reacts with the hydrogen ions ($H^+$) and the electrons ($e^-$), which generates water as shown by the formula (2). Through the chemical reaction, the potential of the electrode catalyst layer 18 becomes approximately 1.0 volt, or the standard electrode potential, as known in the art.

$$\tfrac{1}{2} \cdot O_2 + 2H^+ + 2e^- \rightarrow H_2O \tag{2}$$

Under normal power generation conditions for the fuel battery, the potential of the anode-side electrode catalyst layer 17 (the gas diffusion layer 19) is lower than the potential of the cathode-side electrode catalyst layer 18 (the gas diffusion layer 20), as shown in FIG. 10. Thus, compared to the cathode-side gas passage forming member 22, the anode-side gas passage forming member 21 is less susceptible to metallic oxidation due to a high potential. Therefore, as shown in FIG. 10, an inexpensive stainless steel such as ferrite-based SUS having a low corrosion resistance is used as the material of the gas passage forming member 21. In contrast, the cathode-side gas passage forming member 22, the potential of which can become high, is formed by a metal having a high corrosion resistance such as gold as shown in FIG. 10. Patent Document 1 discloses a fuel battery having a similar structure to the structure shown in FIG. 7.

Patent Document 1: Japanese Laid-Open Patent Publication No. 2007-87768

Patent Document 2: Japanese Laid-Open Patent Publication No. 2007-311089

DISCLOSURE OF THE INVENTION

Problems that the Invention is to Solve

In the above described fuel battery, some of the hydrogen gas is not used in power generation and is drained as fuel off-gas to the outside through the gas passage of the gas passage forming member 21 and the discharging passage M2. Some of the oxygen gas that has not been reduced during the power generation is drained as oxidation off-gas to the outside through the discharging passage (not shown) formed in the frames 13, 14, together with water generated through the reaction of the formula (2) and nitrogen gas in air. Some of the generated water flows into the gas passage of the gas passage forming member 21, while seeping as seepage water through the cathode-side electrode catalyst layer 18, the solid electrolyte membrane 16, the anode-side electrode catalyst layer 17, and the gas diffusion layer 19. The seepage water is drained to the outside through the gas passage of the gas passage forming member 21 and the discharging passage M2, together with the fuel off-gas.

As shown in FIG. 9, the gas passage forming member 21 (22) has a great number of hexagonal ring portions 21a (22a) arranged alternately, and fuel gas flows through gas passages formed by the ring portions 21a (22a) and the through holes 21b (22b). In this configuration, the seepage water (generated water) is likely to adhere to the wall surfaces of the gas passage, which meanders in a complex manner, due to surface tension. Therefore, some of the seepage water (generated water) from the gas passage of the gas passage forming member 21 (22) is not drained to the outside but remains in the gas passage as droplets. The seepage water (generated) remaining in the gas passage causes the following problems.

That is, if droplets W collect on the surfaces of the gas diffusion layers 19, 20 as shown in FIG. 8, fuel gas (oxidation gas) is blocked by the droplets W. That is, the fuel gas is not provided to portions of the gas diffusion layers 19, 20 and the electrode catalyst layers 17, 18 that correspond to the droplets W. As a result, proper cell reaction does not take place at the portions of the electrode catalyst layers 17, 18 to which fuel gas (oxidation gas) is not supplied, which can lower the power generation efficiency. Also, the water droplets W on the surfaces of the gas diffusion layers 19, 20 reduce the cross-sectional area of the gas passages. As a result, the flow of fuel gas (oxidation gas) is hampered and the pressure loss of the fuel gas (oxidation gas) is increased. This lowers the power generation efficiency. The differences in the amount of water droplets W remaining in the gas passages in the gas passage forming members 21 (22) in each of the power generation cells, the flow rate of fuel gas (oxidation gas) in each of the power generation cells may vary, and thus the generated voltage of each of the power generation cells may vary. As a result, the power generation output of the entire fuel cell stack is lowered, which is another cause of reduced power generation efficiency.

If seepage water enters the anode-side gas passage forming member 21 and remains there as water droplets W, hydrogen gas is hindered from entering the electrode catalyst layer 17. This causes local hydrogen deficiency in the electrode catalyst layer 17. As is commonly known, some of the hydrogen in the anode-side gas diffusion layer 19 enters the cathode-side gas diffusion layer 20 after seeping through the electrode catalyst layer 17, the solid electrolyte membrane 16, and the electrode catalyst layer 18. Some of the oxygen in the gas diffusion layer 20 enters the gas diffusion layer 19 after seeping through the electrode catalyst layer 18, the solid electrolyte membrane 16, and the electrode catalyst layer 17. That is, although the amount is small, cross leakage of hydrogen and oxygen occurs between the gas diffusion layer 19 and the gas diffusion layer 20. In a part of the electrode catalyst layer 17 that is deficient in hydrogen, hydrogen for reducing oxygen ($O_2$) does not exist. Thus, if such cross leakage of hydrogen and oxygen occurs, the following phenomenon will be observed.

That is, oxygen ($O_2$) that has entered the anode-side electrode catalyst layer 17 is reduced by hydrated protons (hydrogen ions with water molecules $H^+ \cdot xH_2O$) that exist in the fluoropolymer film of the solid electrolyte membrane 16. That is, the hydrated protons react with oxygen and negatively-charged electrons to generate water as shown by the formula (3) shown below. The hydrated protons are charge carriers of the polymer film forming the solid electrolyte membrane 16, and move among sulfonate groups ($-SO_3-$). The hydrated protons then move from the solid electrolyte membrane 16 to the electrode catalyst layer 17.

$$\tfrac{1}{2} \times O_2 + 2H^+ + 2e^- \rightarrow H_2O \tag{3}$$

As a result, although the potential of the anode-side electrode catalyst layer 17 and the gas diffusion layer 19 is 0 volts as described above, the standard electrode potential of the layers 17, 19, which are deficient in hydrogen due to the reaction of the formula (3), increases to approximately 1.0 volt. The increase of the standard electrode potential of the layers 17, 19 corrodes and oxidizes the gas passage forming member 21, which is formed of ferrite-based SUS having a low corrosion resistance, thus reducing the durability. When the gas passage forming member 21 is corroded and oxidized, its electric resistance is increased, which hampers the flow of generated power. This in turn lowers the power generation output.

In the cathode-side electrode catalyst layer 18, the hydrated protons (hydrogen ions $H^+ \cdot xH_2O$) that form the solid electrolyte membrane 16 decrease. To compensate for the reduction in the hydrated protons, carbon (C) forming the electrode catalyst layer 18 and water are reacted as shown by the formula (4), so that carbon dioxide and hydrogen ions ($H^+$) are generated.

$$C + 2H_2O \rightarrow CO_2 + 4H^+ + 4e^- \tag{4}$$

Through this reaction, carbon particles 51 (C) in the cathode-side electrode catalyst layer 18 are eroded and reduced, and catalyst particles 52 adhering to the carbon particle 51 are drained to the gas passage of the gas passage forming member 22 via the electrode catalyst layer 18 and the gas diffusion layer 20. This makes the electrode catalyst layer 18 thin at an early stage, and thus lowers the durability of the power generation cell. Further, when the carbon particles 51 of the electrode catalyst layer 18 are eroded and the catalyst particles 52 are drained, the amount of catalyst (platinum) is reduced, and the catalyst performance of the electrode catalyst layer 18 is lowered. This lowers the power generation efficiency, resulting in a lowered power generation output.

To solve the above described problems, a fuel battery as shown in FIG. 11 has been proposed in the prior art. This fuel battery includes porous members 61, 62 having continuous pores. The porous members 61, 62 are located between an anode-side gas passage forming member 21 and a separator 23 and between a cathode-side gas passage forming member 22 and a separator 24, respectively. The porous members 61, 62 each have a three-layer structure of a first porous layer, a second porous layer, and a dense layer. The size of the continuous pores are reduced in that order. The anode-side porous member 61 draws in seepage water from the gas passage forming member 21 by capillary action, and the cathode-side porous member 62 draws in generated water from the gas passage forming member 22. The water in the porous members 61, 62 is pushed downstream by gas flow through the gas passage forming members 21, 22 and drained to a discharging passage. (Patent Document 2 discloses a fuel battery having a similar configuration) However, in the conventional fuel battery described above, water that has been drawn into the porous members 61, 62 by capillary action is likely to remain retained in continuous pores, and cannot be easily drained to the discharging passage through the downstream ends of the porous members 61, 62. Therefore, after all the continuous pores of the porous members 61, 62 are filled with water, water that cannot be drawn into the continuous pores spills out to the gas passages in the gas passage forming members 21, 22. Some of the spilled out water is drained to the discharging passage by fuel gas (oxidation gas) flowing through the gas passages. However, droplets of water that has not been drained remain in the gas passages of the gas passage forming members 21, 22. The remaining droplets cause the above described problems.

A first objective of the present invention is to provide a fuel battery that solves the problems related to the above described prior art and improves the power generation efficiency. A second objective of the present invention is to provide a fuel battery that improves power generation efficiency and improves the durability of an anode-side gas passage forming member and a cathode-side electrode catalyst layer.

Means for Solving the Problems

To achieve the first objective, in accordance with a first aspect of the present invention, a fuel battery is provided that includes: a first electrode catalyst layer laid on an anode-side surface of an electrolyte membrane; a second electrode catalyst layer laid on a cathode-side surface of the electrolyte membrane; a first gas passage forming member laid on a front surface of the first electrode catalyst layer, the first gas passage forming member having a first gas passage for supplying fuel gas; a second gas passage forming member laid on a front surface of the second electrode catalyst layer, the second gas passage forming member having a second gas passage for supplying oxidation gas; a first separator provided in the first gas passage forming member; a second separator laid on a front surface of the second gas passage forming member; an introducing passage and a discharging passage for the fuel gas; and an introducing passage and a discharging passage for the oxidation gas. A porous layer is located between the front surface of the second gas passage forming member and a back surface of the second separator that corresponds to the second gas passage forming member, the porous layer having continuous pores for drawing in water from the second gas passage by capillary action.

A drainage promoting member formed of a porous material having continuous pores is provided to communicate with a downstream end of the second gas passage of the second gas passage forming member and to communicate with a downstream end of the continuous pores of the porous layer.

Water drawn from the second gas passage to the porous layer by capillary action flows downstream by fluid pressure of oxidation gas flowing through the second gas passage and is then drawn in by the continuous pores of the drainage promoting member, and water in the drainage promoting member is discharged into the discharging passage by fluid pressure of oxidation gas that flows from the second gas passage into the continuous pores of the drainage promoting member.

In the fuel battery according to the present invention, it is preferable that the drainage promoting member be formed integrally of the same material as the porous layer.

In the fuel battery according to the present invention, it is preferable that one of the following structures be selected: a structure in which the wettability of the continuous pores of the drainage promoting member is set higher than the wettability of the continuous pores of the porous layer; and a structure in which the hydration property of the continuous pores of the drainage promoting member is set higher than the hydration property of the continuous pores of the porous layer.

To achieve the second objective, in accordance with a second aspect of the present invention, a fuel battery is provided that includes: a first electrode catalyst layer laid on an anode-side surface of an electrolyte membrane; a second electrode catalyst layer laid on a cathode-side surface of the electrolyte membrane; a first gas passage forming member laid on a front surface of the first electrode catalyst layer, the first gas passage forming member having a first gas passage for supplying fuel gas; a second gas passage forming member laid on a front surface of the second electrode catalyst layer, the second gas passage forming member having a second gas passage for supplying oxidation gas; a first separator laid on a front surface of the first gas passage forming member; a second separator provided in the second gas passage forming member; an introducing passage and a discharging passage for the fuel gas; and an introducing passage and a discharging passage for the oxidation gas.

A first porous layer is located between the front surface of the first gas passage forming member and a back surface of the first separator that corresponds to the first gas passage forming member, the first porous layer having continuous pores for drawing in water from the first gas passage by capillary action.

A first drainage promoting member formed of a porous material having continuous pores is provided to communicate with a downstream end of the first gas passage of the first gas passage forming member and to communicate with a downstream end of the continuous pores of the porous layer.

Water drawn from the first gas passage to the first porous layer by capillary action flows downstream by fluid pressure of fuel gas flowing through the first gas passage and is then drawn in by the continuous pores of the first drainage promoting member, and water in the first drainage promoting member is discharged into the discharging passage by fluid pressure of fuel gas that flows from the first gas passage into the continuous pores of the first drainage promoting member.

The fuel battery of the present invention is preferably configured such that:

a second porous layer is located between the front surface of the second gas passage forming member and a back surface of the second separator that corresponds to the second gas passage forming member, the second porous layer having continuous pores for drawing in water from the second gas passage by capillary action;

a second drainage promoting member formed of a porous material having continuous pores is provided to communicate with a downstream end of the second gas passage of the second gas passage forming member and to communicate with a downstream end of the continuous pores of the second porous layer, and water drawn from the second gas passage to the second porous layer by capillary action flows downstream by fluid pressure of oxidation gas flowing through the second gas passage and is then drawn in by the continuous pores of the second drainage promoting member, and water in the drainage promoting member is discharged into the discharging passage by fluid pressure of oxidation gas that flows from the second gas passage into the continuous pores of the drainage promoting member.

In the fuel battery according to the present invention, it is preferable that the drainage promoting member be formed integrally of the same material as the porous layer.

In the fuel battery according to the present invention, it is preferable that one of the following structures be selected: a structure in which the wettability of the continuous pores of the drainage promoting member is set higher than the wettability of the continuous pores of the porous layer; and a structure in which the hydration property of the continuous pores of the drainage promoting member is set higher than the hydration property of the continuous pores of the porous layer.

(Operation)

In a case where the porous layer and the drainage promoting member are provided on the cathode side, after generated water in the gas passage of the cathode-side gas passage forming member is drawn into the porous layer by capillary action, the generated water flows toward the drainage promoting member by fluid pressure of oxidation gas flowing through the gas passage. The generated water drawn into the drainage promoting member is drained into the discharging passage by the fluid pressure of oxidation off-gas flowing though the continuous pores of the drainage promoting member, so that the oxidation gas is properly supplied to the electrode catalyst layer. Therefore, deficiency of oxidation gas is avoided, and the power generation efficiency is improved. Generated water is prevented from remaining in the gas passages, and the pressure loss of oxidation gas flowing through the gas passages due to generated water is reduced. This improves the power generation efficiency.

In a case where the porous layer and the drainage promoting member are provided on the anode side, after seepage water in the gas passage of the anode-side gas passage forming member is drawn into the porous layer by capillary action, the seepage water flows toward the drainage promoting member by fluid pressure of fuel gas flowing through the gas passage. The seepage water drawn into the drainage promoting member is drained into the discharging passage by the fluid pressure of the fuel off-gas flowing though the continuous pores of the drainage promoting member, so that fuel gas is properly supplied to the electrode catalyst layer. Therefore, deficiency of fuel is avoided, and the power generation efficiency is improved. Since the seepage water does not remain in the gas passage of the gas passage forming member, the pressure loss of fuel gas flowing through the gas passages due to seepage water is reduced. This improves the power generation efficiency. Since water is prevented from entering the anode-side electrode catalyst layer, deficiency of fuel in the electrode catalyst layer is avoided. Therefore, a rise in the potential of the electrode catalyst layer due to fuel deficiency is prevented. Accordingly, erosion of the gas passage forming member due to rise in the potential of the electrode catalyst layer is prevented. In addition, since fuel deficiency is avoided in the anode-side electrode catalyst layer, it is possible to prevent reduction of hydrated protons in the electrolyte membrane as described in the BACKGROUND ART. As a result, it is possible to prevent erosion of carbons in the cathode-side electrode catalyst layer, which would be caused by reduction in hydrated protons. This improves the durability of the electrode catalyst layer.

Effects of the Invention

According to the present invention, in a case where a porous layer and a drainage promoting portion are provided on an anode side, the power generation efficiency is improved, and the durability of an anode-side gas passage forming member and a cathode-side electrode catalyst layer is improved. Also, in a case where a porous layer and a drainage promoting portion are provided on a cathode side, the power generation efficiency can be improved.

DETAILED DESCRIPTION OF THE INVENTION (First Embodiment)

A fuel battery according to a first embodiment of the present invention will be described with reference to FIGS. 1 to 4.

Figure 2:
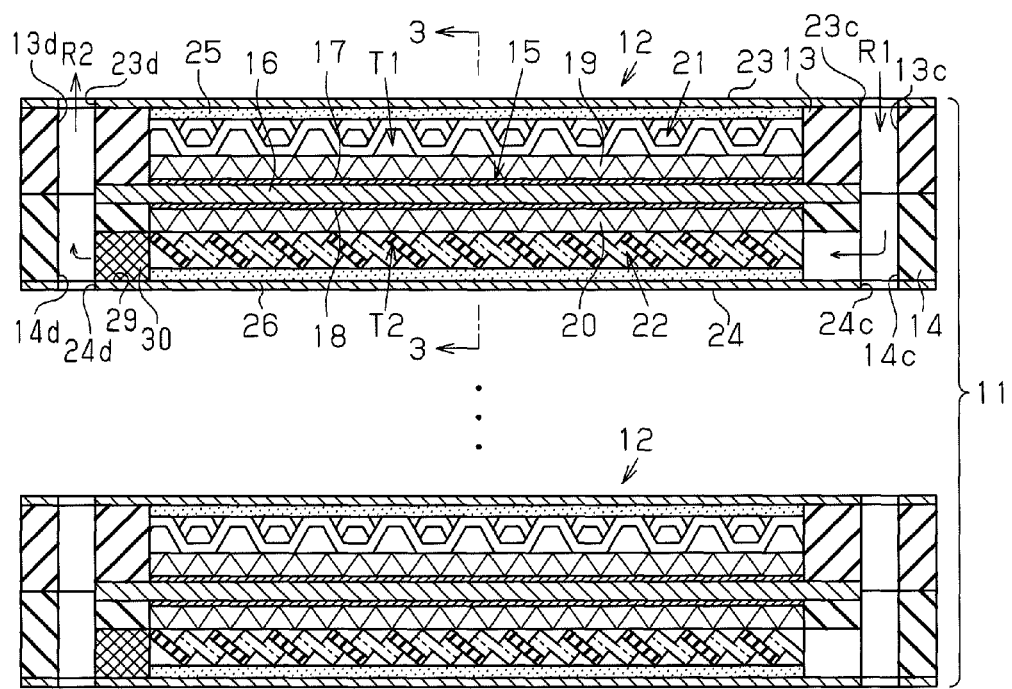
FIG. 2 is a vertical cross-sectional view showing a power generation cell.

As shown in FIG. 2, a fuel cell stack 11 of the first embodiment is a solid polymer type, and is formed by a number of stacked power generation cells 12.

Figure 3:
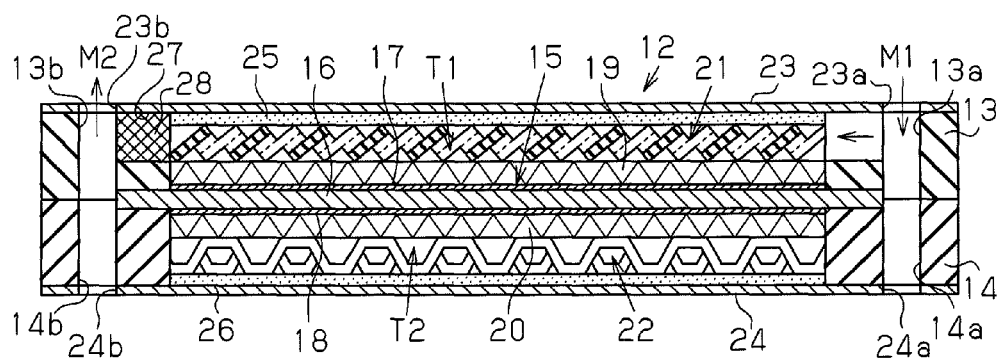
FIG. 3 is a cross-sectional view taken along line 3-3 in FIG. 2.
Figure 4:
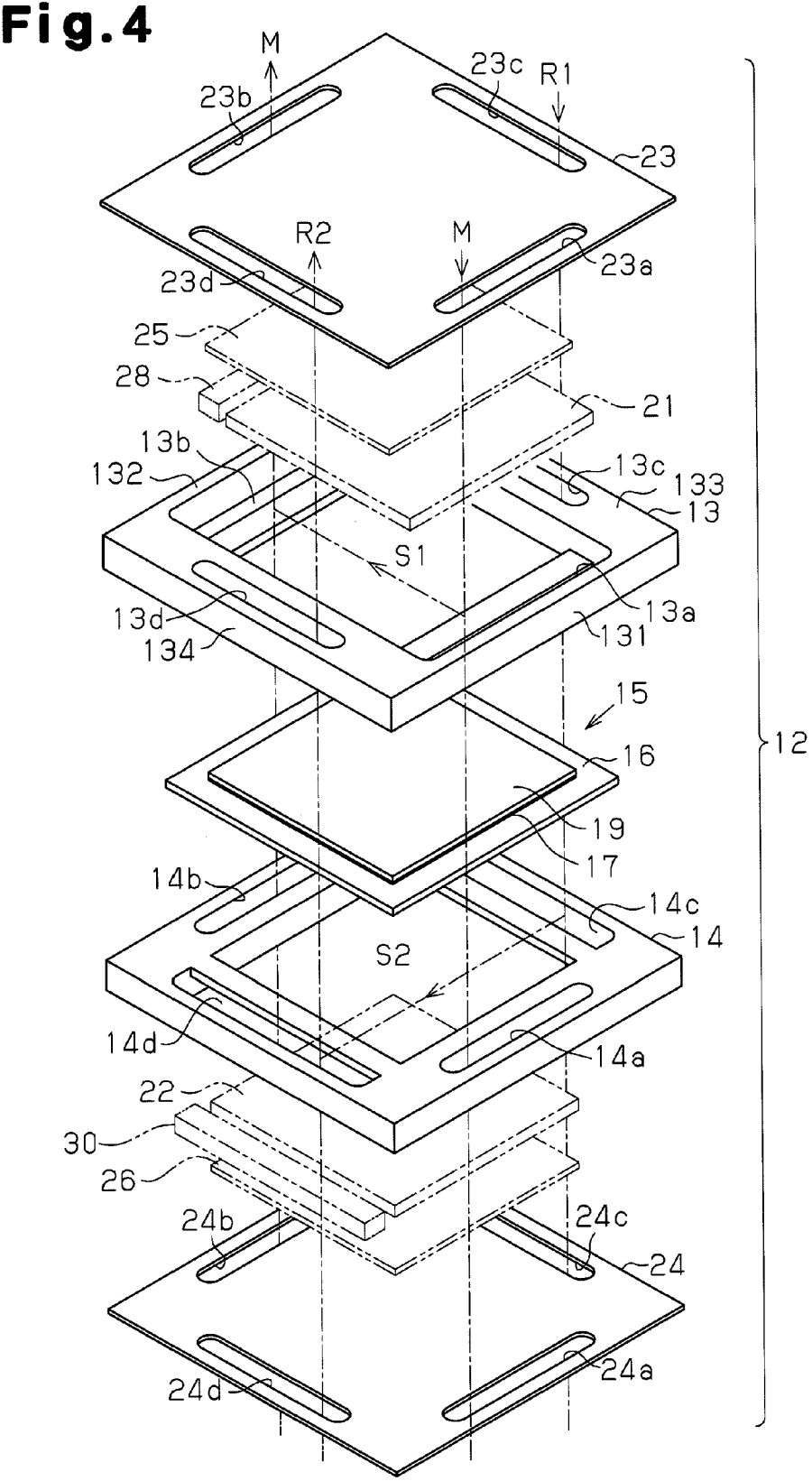
FIG. 4 is an exploded perspective view illustrating first and second frames, an electrode structure, first and second gas passage forming members, porous layers, and drainage promoting members.

As shown in FIG. 4, the power generation cell 12 is shaped like a rectangular frame and includes first and second frames 13, 14 made of synthetic rubber (or synthetic resin) and a membrane electrode assembly (MEA) 15, which serves as an electrode structure. The first frame 13 defines in it a passage space S1 for fuel gas, and the second frame 14 defines in it a passage space S2 for oxidation gas. The MEA 15 is arranged between the frames 13, 14. As shown in FIGS. 2 and 3, the power generation cell 12 has a first gas passage forming member 21, which is formed by ferrite-based SUS (stainless steel) and is accommodated in the fuel gas passage space S1, and a second gas passage forming member 22, which is made of titanium or gold and is accommodated in the oxidation gas passage space S2. Further, the power generation cell 12 has a first separator 23 and a second separator 24, which are made of titanium. The first separator 23 is shaped like a flat plate, and is bonded to the upper surfaces of the first frame 13 and the first gas passage forming member 21 as viewed in the drawing. The second separator 24 is bonded to the lower surfaces of the frame 14 and the second gas passage forming member 22 as viewed in the drawing. In FIG. 4, the gas passage forming members 21, 22 are illustrated as flat plates in a simplified manner.

As shown in FIGS. 2 and 3, the MEA 15 is formed by an electrolyte membrane 16, a first electrode catalyst layer 17, a second electrode catalyst layer 18, and conductive first and second gas diffusion layers 19, 20. The first electrode catalyst layer 17 is formed of catalyst that is laid on the anode-side surface of the electrolyte membrane 16, that is, on the upper surface as viewed in the drawing. The second electrode catalyst layer 18 is formed of catalyst that is laid on the cathode-side surface of the electrolyte membrane 16, that is, on the lower surface as viewed in the drawing. The gas diffusion layers 19, 20 are bonded to the surfaces of the electrode catalyst layers 17, 18, respectively. When the fuel battery of the present embodiment is used, the electrode structure 15 of each power generation cell 12 in the fuel cell stack 11 shown in FIG. 2 is parallel to the vertical direction.

Figure 8:
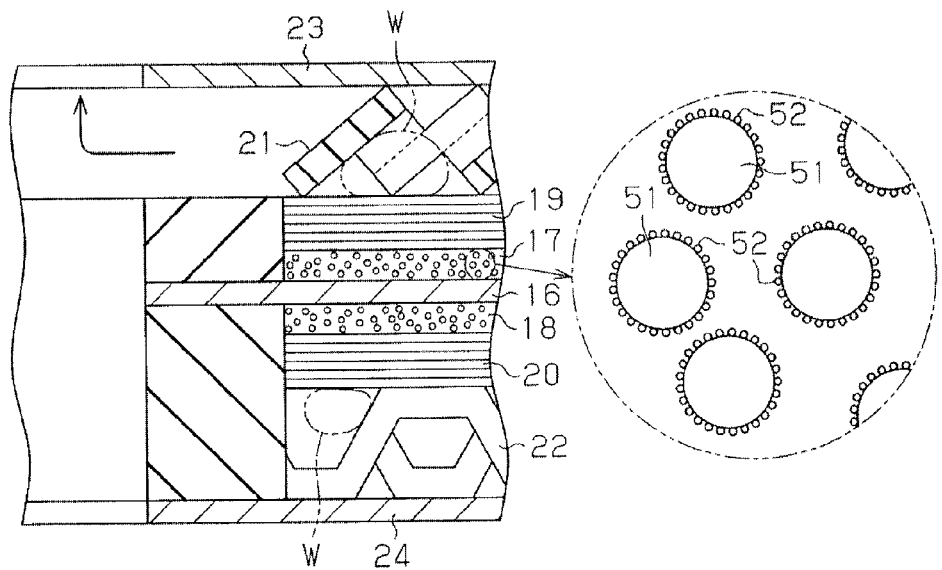
FIG. 8 is a partially enlarged cross-sectional view illustrating the fuel battery shown in FIG. 7.

The solid electrolyte membrane 16 is formed of a fluoropolymer film. As shown in FIG. 8, which is described in the BACKGROUND ART, the electrode catalyst layers 17, 18 each have carbon particles 51 supporting a platinum catalyst, and a great number of platinum (Pt) catalyst particles 52 adhere to the surface of each carbon particle 51. The electrode catalyst layers 17, 18 are bonded to the solid electrolyte membrane 16 by paste for forming an electrode catalyst layer. The catalyst particles 52 serving as catalyst increase the power generation efficiency when power is generated by the fuel battery. In the present embodiment, the diameter of the carbon particles 51 is several micrometers, and the diameters of the catalyst particles 52 is 2 nm. The gas diffusion layers 19, 20 are formed of carbon paper.

Figure 9:
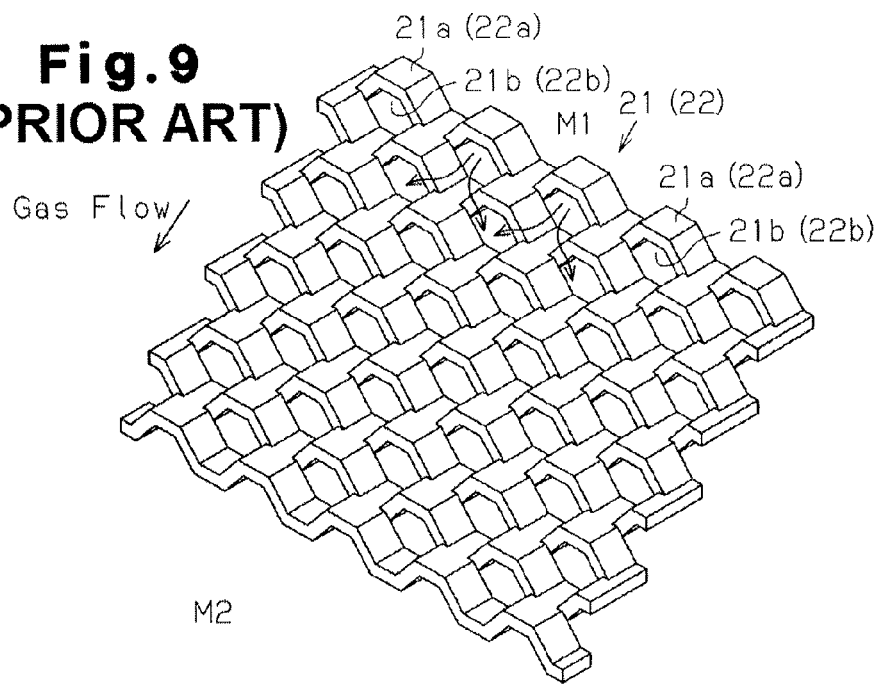
FIG. 9 is a partial perspective view illustrating a gas passage forming member used in the fuel battery shown in FIG. 7.
Figure 10:
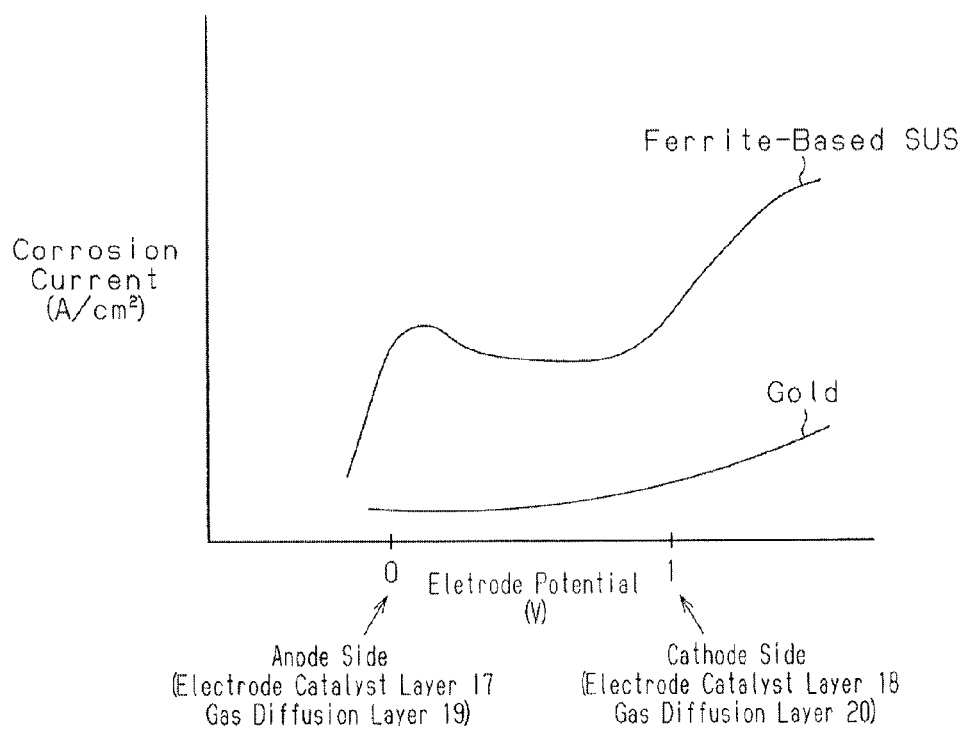
FIG. 10 is a graph showing the relationship between a corrosion current and the potential on the anode side and the cathode side of a fuel battery.
Figure 11:
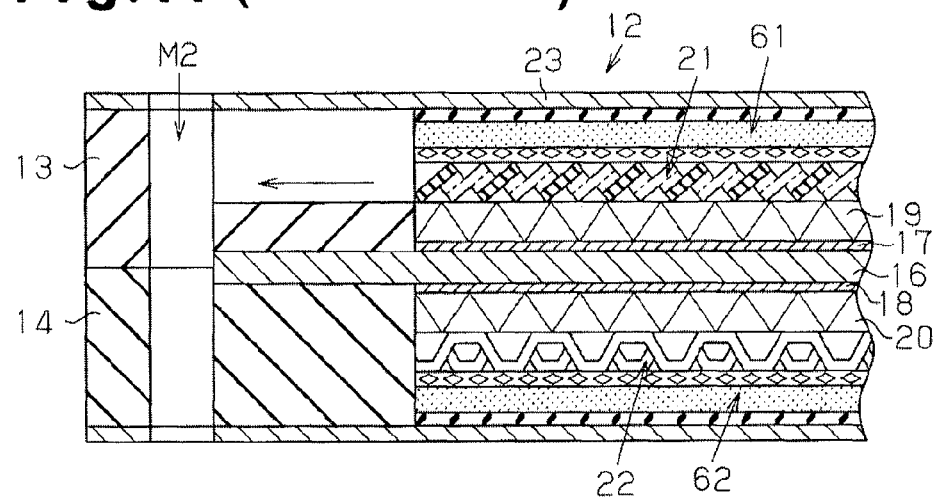
FIG. 11 is a vertical cross-sectional view illustrating a prior art fuel battery.

The first gas passage forming member 21 located on the anode side and the second gas passage forming member 22 located on the cathode side have similar structures. In the present embodiment, the gas passage forming members 21, 22 are formed by a metal lath shown in FIG. 9, which has been described in the BACKGROUND ART.

As shown in FIG. 2, a first porous layer 25 is located between the first gas passage forming member 21 and the first separator 23. The first porous layer 25 is formed of conductive porous material having continuous pores. Likewise, a second porous layer 26 is located between the second gas passage forming member 22 and the second separator 23. The second porous layer 26 is formed of conductive porous material having continuous pores.

As shown in FIG. 4, the fuel gas passage space S1 of the first frame 13 is shaped rectangular as viewed from above. Elongated fuel gas introducing port 13a and fuel gas discharging port 13b are formed in two parallel and opposite sides 131, 132 of the first frame 13. The ports 13a, 13b communicate with the fuel gas passage space S1. Elongated oxidation gas introducing port 13c and oxidation gas discharging port 13d are formed in two sides 133, 134 of the frame 13, which are adjacent to the sides 131, 132.

The second frame 14 has a similar structure as the first frame 13. The second frame 14 has a fuel gas introducing port 14a, a fuel gas discharging port 14b, an oxidation gas introducing port 14c, and an oxidation gas discharging port 14d, which correspond to the fuel gas introducing port 13a, the fuel gas discharging port 13b, the oxidation gas introducing port 13c, and the oxidation gas discharging port 13d of the frame 13, respectively.

A fuel gas introducing port 23a, a fuel gas discharging port 23b, an oxidation gas introducing port 23c, and an oxidation gas discharging port 23d are formed in the four sides of the first separator 23 to correspond to the fuel gas introducing port 13a, the fuel gas discharging port 13b, the oxidation gas introducing port 13c, and the oxidation gas discharging port 13d formed in the first frame 13, respectively. Likewise, a fuel gas introducing port 24a, a fuel gas discharging port 24b, an oxidation gas introducing port 24c, and an oxidation gas discharging port 24d are formed in the four sides of the second separator 24 to correspond to the fuel gas introducing port 14a, the fuel gas discharging port 14b, the oxidation gas introducing port 14c, and the oxidation gas discharging port 14d formed in the second frame 14, respectively.

Figure 1:
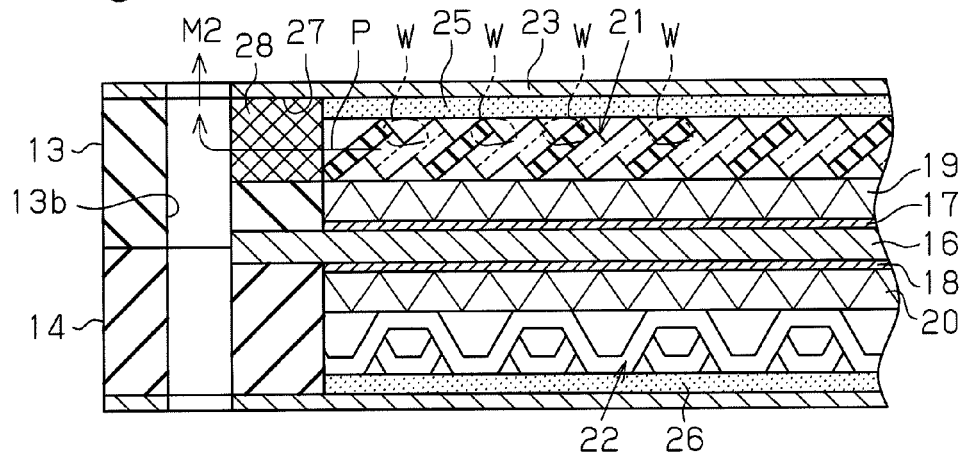
FIGS. 1(a) to 1(c) are longitudinal partial cross-sectional views illustrating a fuel battery according to a first embodiment of the present invention.
Figure 1:
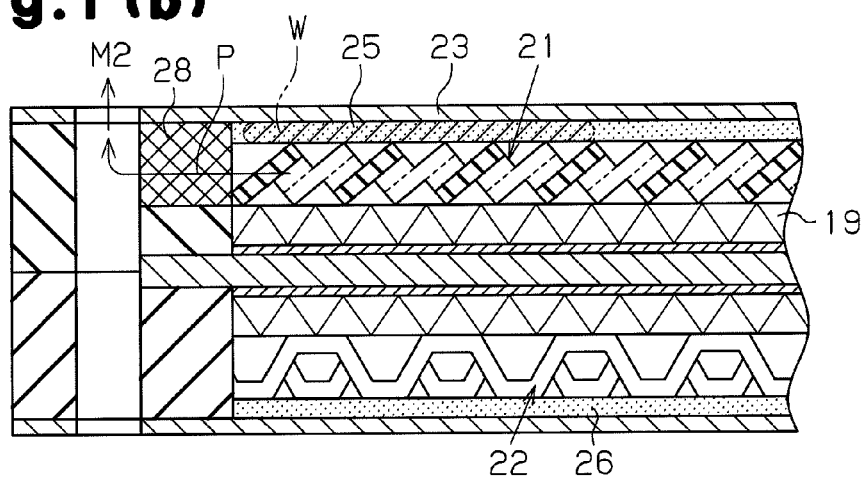
Figure 1:
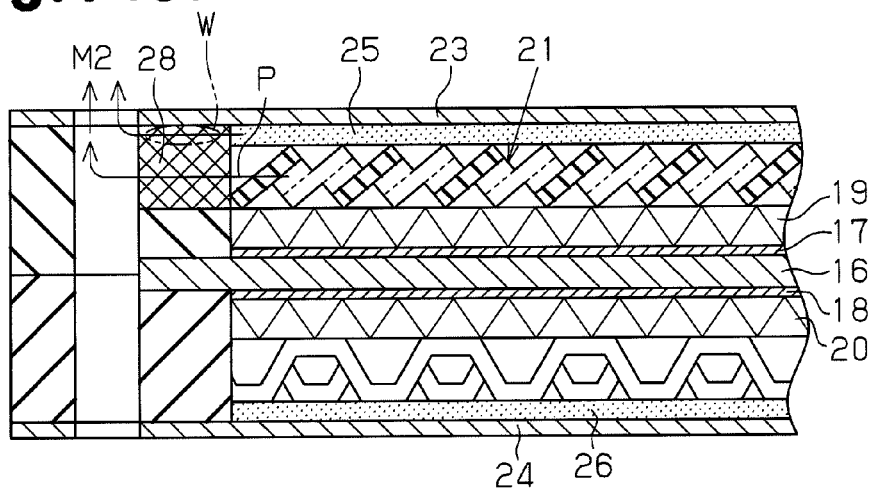

In the fuel gas passage space S1 (the oxidation gas passage space S2) of the first (second) frame 13, the first, second gas passage forming member 21 (22) contacts the front surfaces of the gas diffusion layer 19 (20) and the back surface of the first (second) porous layer 25 (26), as shown in FIG. 1.

As shown in FIGS. 3 and 4, the fuel gas introducing port 23a of the first separator 23, the fuel gas introducing port 13a of the frame 13, the fuel gas introducing port 14a of the second frame 14, and the fuel gas 24a of the second separator 24 form a supply passage M1 for supplying fuel gas to each power generation cell 12. The fuel gas discharging port 23b of the first separator 23, the fuel gas discharging port 13b of the first frame 13, the fuel gas discharging port 14b of the second frame 14, the fuel gas discharging port 23b of the separator 23, and the fuel gas discharging port 24b of the second separator 24 form a fuel off-gas discharging passage M2 through each power generation cell 12. Fuel gas that is supplied to the fuel gas supply passage M1 from the outside of the fuel battery passes through a gas passage T1 of the first gas passage forming member 21 and is used for generating power. Thereafter, the fuel gas is drawn to the discharging passage M2 as fuel off-gas.

The oxidation gas introducing port 23c of the first separator 23, the oxidation gas introducing port 13c of the frame 13, the oxidation gas introducing port 14c of the second frame 14, and the oxidation gas introducing port 24c of the second separator 24 form a supply passage R1 for supplying oxidation gas to each power generation cell 12. The oxidation gas discharging port 23d of the first separator 23, the oxidation gas discharging port 13d of the frame 13, the oxidation gas discharging port 14d of the second frame 14, and the oxidation gas discharging port 24d of the second separator 24 form a discharging passage R2 for discharging oxidation off-gas from each power generation cell 12. Oxidation gas that is supplied to the oxidation gas supply passage R1 from the outside of the fuel battery passes through a gas passage T2 of the second gas passage forming member 22 and is used for generating power. Thereafter, the oxidation gas is drawn into the discharging passage R2 as oxidation off-gas.

As shown in FIG. 3, an upstream portion of the passage space S1 formed in the first gas passage forming member 21 communicates with the fuel gas introducing port 13a of the first frame 13, and a downstream portion of the passage spaced S1 communicates with the fuel gas discharging port 13b of the first frame 13. A downstream space in the passage space S1 forms a communication passage 27 where the first gas passage forming member 21 or the first porous layer 25 does not exist. A drainage promoting member 28 is provided in the communication passage 27. The drainage promoting member 28 is formed of a porous material having continuous pores, such as urethane sponge or natural sponge. The downstream edge of the first gas passage forming member 21 and the downstream edge of the continuous pores of the first porous layer 25 contact the drainage promoting member 28 over the entire area. The downstream end of the gas passage T1 of the first gas passage forming member 21 communicates with continuous pores of the drainage promoting member 28, the downstream end of continuous pores of the first porous layer 25 also communicates with continuous pores of the drainage promoting member 28.

As shown in FIG. 2, an upstream portion of the passage space S2 formed in the second gas passage forming member 22 communicates with the fuel gas introducing port 14a of the second frame 14, and a downstream portion of the passage spaced S2 communicates with the fuel gas discharging port 14b of the second frame 14. A downstream space in the passage space S2 forms a communication passage 29 where the second gas passage forming member 22 or the second porous layer 26 does not exist. A second drainage promoting member 30 is provided in the communication passage 29. The second drainage promoting member 30 is formed of a porous material having continuous pores, such as urethane sponge or natural sponge. The downstream edge of the second gas passage forming member 22 and the downstream edge of the continuous pores of the second porous layer 26 contact the second drainage promoting member 30 over the entire area. The downstream end of the gas passage T2 of the second gas passage forming member 22 communicates with continuous pores of the drainage promoting member 30, the downstream end of continuous pores of the second porous layer 26 also communicates with continuous pores of the drainage promoting member 30.

The thicknesses of the first and second porous layers 25, 26 are set to, for example, 0.5 to 1.0 mm. The porosity of the first and second porous layers 25, 26, which is the ratio of the continuous pores to the whole volume, is set to 30 to 60%. Such a setting for the porosity allows water in the gas passages T1, T2 to be easily drawn into the first and second porous layers 25, 26 by capillary action. The porosity of the first and second drainage promoting members 28, 30 is set in a range, for example, of 50 to 80%. In the present embodiment, the average pore diameter of the continuous pores of the porous layer 25, 26 is set to, for example, 5 gm to 30 gm, and the average pore diameter of the continuous pores of the first and second drainage promoting members 28, 30 is set to, for example, 10 μm to 50 μm.

Operation of the fuel battery configured as above will now be described.

In FIG. 3, fuel gas that is supplied to the fuel gas supply passage M1 forms turbulence when flowing along the direction of the arrow in the gas passage T1 of the first gas passage forming member 21. The fuel gas is thus diffused in the gas passage T1. The fuel gas is further properly diffused by passing through the first gas diffusion layer 19, so as to be evenly supplied to the first electrode catalyst layer 17.

In FIG. 2, oxidation gas that is supplied to the oxidation gas supply passage R1 forms turbulence when flowing along the direction of the arrow in the gas passage T2 of the second gas passage forming member 22. The oxidation gas is thus diffused in the gas passage T2. The oxidation gas is further properly diffused by passing through the second gas diffusion layer 20, so as to be evenly supplied to the electrode catalyst layer 18. The supply of the fuel gas and the oxidation gas initiates an electrode reaction at the MEA 15, so that power is generated. The fuel cell stack 11, which is formed by the stacked power generation cells 12, thus outputs a desired power.

During such a power generating state, water is generated in the gas passage T2 of the cathode-side second gas passage forming member 22, as described in the BACKGROUND ART. Some of the hydrogen gas is not used in power generation and is drained as fuel off-gas to the outside through the gas passage T1 of the first gas passage forming member 21, the continuous pores of the first drainage promoting member 28, and the fuel gas discharging passage M2. Some of the oxygen gas that has not been oxidized during the power generation is conducted, together with nitrogen gas and generated water, to the oxidation gas discharging passage R2 formed in the frames 13, 14 via the continuous pores of the second drainage promoting member 30 and is drained as oxidation off-gas to the outside. Some of the generated water flows as seepage water into the gas passage T1 of the first gas passage forming member 21, while seeping through the cathode-side second electrode catalyst layer 18, the solid electrolyte membrane 16, the first electrode catalyst layer 17, and the first gas diffusion layer 19.

When fuel gas flows through the gas passage T1 as indicated by the arrow in FIG. 3, seepage water contained in the fuel gas collects as droplets W on the wall of the gas passage T1. The droplets W (seepage water) are drawn into the continuous pores of the first porous layer 25 as shown in FIG. 1(b), by capillary action of the continuous pores of the first porous layer 25. The fuel gas flowing through the gas passage T1 becomes fuel off-gas and passes through the continuous pores of the first drainage promoting member 28, and is then conducted into the fuel off-gas discharging passage M2. The droplets W (seepage water) drawn into the first porous layer 25 are caused to flow downstream in the gas flowing direction P by the fluid pressure of fuel gas flowing through the gas passage T1, and then drawn into the continuous pores of the first drainage promoting member 28 by capillary action as shown in FIG. 1(c). The seepage water W drawn by the first drainage promoting member 28 is forced out by the fluid pressure of fuel off-gas passing through the continuous pores of the promoting member 28. That is, the flow of fuel off-gas flowing through the continuous pores of the promoting member 28 forces out the seepage water W, which has been drawn into the continuous pores of the promoting member 28, by pressure difference. Accordingly, the pressure of the continuous pores of the promoting member 28 becomes lower than the pressure of the continuous pores of the first porous layer 25. This pressure difference draws the seepage water in the continuous pores of the first porous layer 25 to the continuous pores in the promoting member 28, so that the seepage water is drained into the fuel off-gas discharging passage M2.

Like the seepage water in the gas passage T1, water generated in the gas passage T2 in the cathode-side second gas passage forming member 22 as shown in FIG. 2 is drained into the oxidation gas discharging passage R2 by capillary action of the continuous pores of the cathode-side second porous layer 26 and the second drainage promoting member 30, and the fluid pressure gas that flows through the continuous pores of the second drainage promoting member 30.

The fuel battery according to the first embodiment has the following advantages.

(1) In the first embodiment, the first porous layer 25 is located between the anode-side first gas passage forming member 21 and the separator 23, and the first drainage promoting member 28 is located in the communication passage 27 formed in a downstream portion of the passage space S1. Seepage water in the gas passage T1 formed in the first gas passage forming member 21 is drawn into the first porous layer 25 by capillary action of the first porous layer 2. The seepage water drawn into the porous layer 25 flows to the first drainage promoting member 28 by surface tension of water. Thereafter, as described above, the fluid pressure of fuel off-gas flowing through the promoting member 28 allows the seepage water to be efficiently drawn from the porous layer 25 to the drainage promoting member 28 and to be drained into the fuel off-gas discharging passage M2. Since this configuration properly supplies fuel gas to the first electrode catalyst layer 17, deficiency of oxidation gas is avoided, and power generation efficiency is improved.

Also, the seepage water in the gas passage T1 of the first gas passage forming member 21 is drawn into the first porous layer 25 and drained into the fuel off-gas discharging passage M2 via the first drainage promoting member 28. This prevents the seepage water from remaining in the gas passage T1, and the pressure loss of fuel gas flowing through the gas passage T1 due to seepage water is thus reduced. This improves power generation efficiency. Further, the potential of the anode-side electrode catalyst layer 17 is prevented from being increased by hydrogen deficiency, and corrosion of the first gas passage forming member 21 due to increase in the potential is prevented. This improves durability. The selection criteria for the material of the first gas passage forming member 21 are relaxed, so that inexpensive material can be used as the material for the first gas passage forming member 21. This reduces material costs. In addition, since fuel deficiency is avoided in the anode-side first electrode catalyst layer 17, it is possible to prevent reduction of hydrated protons in the electrolyte membrane 16 described in the BACKGROUND ART. Since reduction in the hydrated protons is compensated for, erosion of carbon particles 51 in the cathode-side electrode catalyst layer 18 is prevented. This improves the durability of the electrode catalyst layer 18.

(2) In the first embodiment, the second porous layer 26 is located between the cathode-side second gas passage forming member 22 and the separator 24, and the second drainage promoting member 30 is provided in the communication passage 29 in a downstream portion of the passage space S2. Thus, water generated in the gas passage T2 in the cathode-side second gas passage forming member 22 is drained into the oxidation off-gas discharging passage R2 by the second porous layer and the second drainage promoting member. This prevents the generated water from remaining in the gas passage T2 of the second gas passage forming member 22, and the pressure loss of oxidation gas flowing through the gas passage T2 due to generated water is reduced. This improves power generation efficiency. Also, since this configuration properly supplies fuel gas to the electrode catalyst layer 18, deficiency of oxidation gas is avoided, and power generation efficiency is improved.

(3) In the first embodiment, the first and second porous layers 25, 26 and the first and second drainage promoting members 28, 30 are provided on the anode side and the cathode side, respectively. The seepage water and the generated water in the gas passages T1, T2 are properly drained into the fuel gas discharging passages M2, R2, respectively. It is therefore possible to eliminate variations in power generation output of the power generation cells 12 and thus to stabilize power generation performance of the fuel battery. For example, in a low load operating state of the fuel battery, the flow rate of gas flowing through the gas passages T1, T2 of the gas passage forming members 21, 22 is low, which causes the amount of seepage water and generated water remaining in the gas passages T1, T2 to become imbalanced. However, in the first embodiment, since drainage of water from the power generation cells 12 is properly performed, so that variations in the power generation output of the cells 12 are eliminated. This improves battery performance. In a high load operating state of the fuel battery, the amount of water generated in the gas passage T2 of the cathode-side second gas passage forming member 22 is increased. As described above, the generated water is properly drained, so that oxidation gas is reliably diffused in the gas passage T2. This stabilizes power generation output.

(Second Embodiment)

Figure 5:
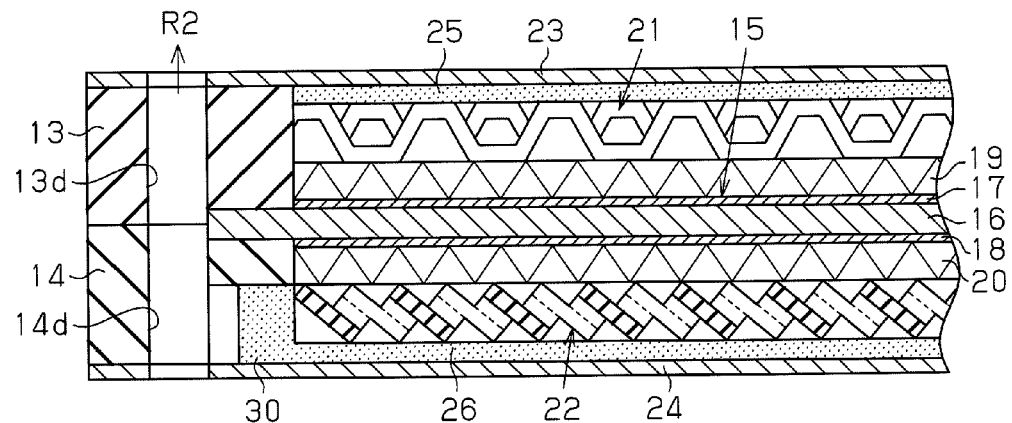
FIG. 5 is a vertical cross-sectional view illustrating a fuel battery according to a second embodiment of the present invention.

A second embodiment according to the present invention will now be described with reference to FIG. 5. In the following embodiments, components having similar functions as those in the first embodiment are given the same reference numerals, and the descriptions thereof are omitted. Operations and advantages of components different from those in the first embodiment will mainly be discussed.

In the second embodiment, a second drainage promoting member 30 that is formed of the same material as a cathode-side second porous layer 26 is integrated with the downstream end of the second porous layer 26. Although not illustrated, a first drainage promoting member 28 that is formed of the same material as an anode-side first porous layer 25 is integrated with the downstream end of the first porous layer 25.

In the second embodiment, since the first (second) porous layer 25 (26) and the first (second) drainage promoting member 28 (30) are formed integrally, seepage water (generated water) drawn into the first (second) porous layer 25 (26) smoothly flows to the first (second) drainage promoting member 28 (30), and the water is further properly discharged.

(Third Embodiment)

Figure 6:
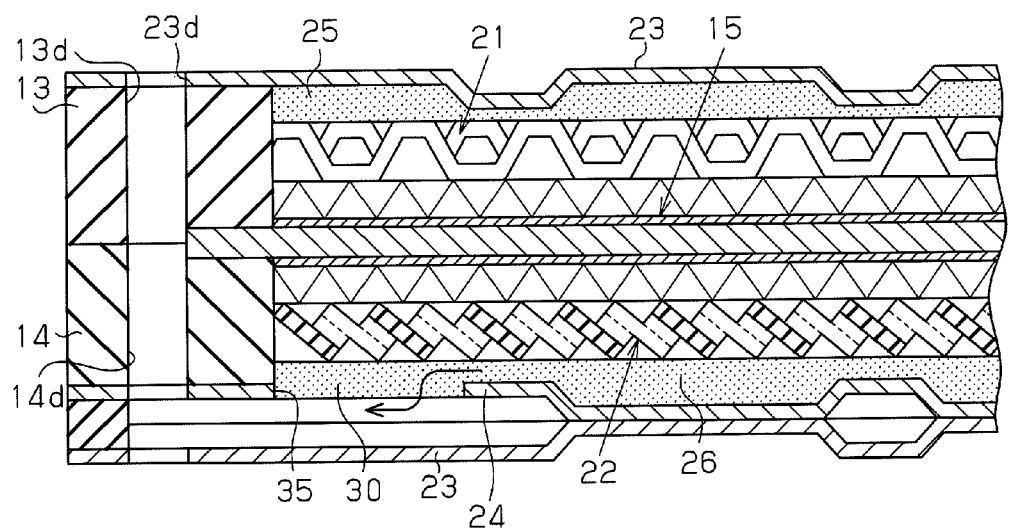
FIG. 6 is a vertical cross-sectional view illustrating a fuel battery according to a third embodiment of the present invention.
Figure 7:
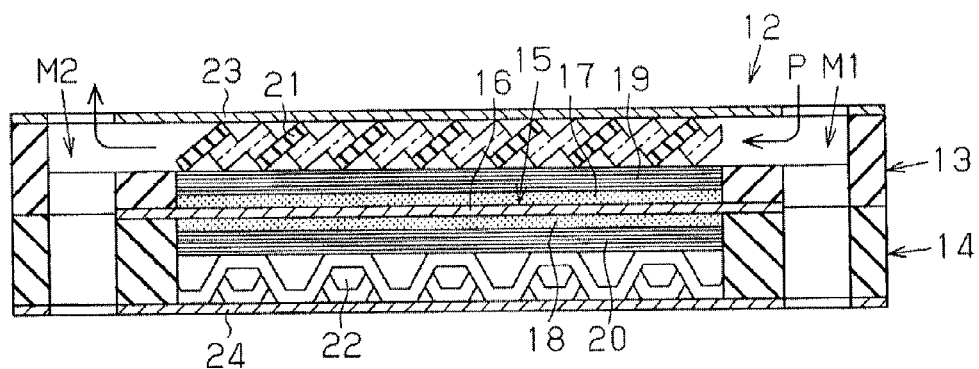
FIG. 7 is a vertical cross-sectional view illustrating a prior art fuel battery.

In a third embodiment, a drain port 35 is formed in a cathode-side separator 24 as shown in FIG. 6. A communication passage 36 for oxidation off-gas and generated water is formed between the separator 24 and an anode-side separator 23 of an adjacent power generation cell. The communication passage 36 communicates with the drain port 35. A second drainage promoting member 30, which is formed of the same material as a second porous layer 26 and is integrated with the second porous layer 26 is accommodated in the drain port 35. Although not illustrated, the configuration on the anode side is the same as that on the cathode side.

This configuration allows oxidation gas and generated water to be conducted into the oxidation off-gas discharging passage R2 by the second drainage promoting member 30 provided in the drain port 35.

(Modifications)

The present invention may be modified according to the embodiments described below.

Although not illustrated, a porous layer 25 and a drainage promoting member 28 may be provided only on the anode side in each of the illustrated embodiments. This configuration not only improves power generation efficiency of the fuel battery, but also improves durability of the anode-side second gas passage forming member 22 and the cathode-side electrode catalyst layer 18. Also a porous layer 26 and a drainage promoting member 30 may be provided only on the cathode side. This configuration improves power generation efficiency of the fuel battery.

In the first or second embodiment, the average pore diameter of the continuous pores of the drainage promoting member 30 is set to be smaller than or equal to the average pore diameter of the continuous pores of the porous layers 25, 26, so that water in the continuous pores of the porous layers 25, 26 is drawn into the continuous pores of the drainage promoting member 30 by capillary action. Instead, the wettability of the continuous pores of the drainage promoting member 30 may be set greater than the wettability of the continuous pores of the porous layers 25, 26. In other words, the droplet contact angle of the continuous pores of the drainage promoting member 30 may be set greater than the droplet contact angle of the continuous pores of the porous layers 25, 26. The hydration property of the continuous pores of the drainage promoting member 30 may be set better the hydration property of the continuous pores of the porous layer 25, 26. In these cases, even if the average pore diameter of the continuous pores of the drainage promoting member 30 is set greater than the average pore diameter of the continuous pores of the porous layers 25, 26, water in the continuous pores of the porous layer 25, 26 is properly drawn into the continuous pores of the drainage promoting member 30.

In the fuel battery of each of the illustrated embodiments, grooves for conducting coolant water may be formed in the separators 23, 24 of the power generation cells 12.

The gas diffusion layers 19, 20 may be omitted from the fuel batteries of the above illustrated embodiments.

In a fuel battery in which the porous layer 26 is provided only on the cathode side, the anode side first gas passage forming member 21 and the first separator 23 may be integrally formed. The frame 13 and the first separator 23 may be integrally formed of metal, for example, by forging.

In a fuel battery in which the porous layer 25 is provided only on the anode side, the cathode side second gas passage forming member 22 and the second separator 24 may be integrally formed. The frame 14 and the second separator 24 may be integrally formed of metal, for example, by forging.

While the invention has been described in detail and with reference to specific embodiments thereof, it will be apparent to one skilled in the art that various changes and modifications can be made therein without departing from the spirit and scope thereof.

The invention claimed is:

1. A fuel battery comprising:
a first electrode catalyst layer laid on an anode-side surface of an electrolyte membrane;
a second electrode catalyst layer laid on a cathode-side surface of the electrolyte membrane;
a first gas passage forming member laid on a front surface of the first electrode catalyst layer, the first gas passage forming member having a first gas passage for supplying fuel gas;
a second gas passage forming member laid on a front surface of the second electrode catalyst layer, the second gas passage forming member having a second gas passage for supplying oxidation gas;
a first separator provided in the first gas passage forming member;
a second separator laid on a front surface of the second gas passage forming member;
an introducing passage and a discharging passage for the fuel gas; and
an introducing passage and a discharging passage for the oxidation gas,
wherein a porous layer is located between the front surface of the second gas passage forming member and a back surface of the second separator that corresponds to the second gas passage forming member, the porous layer having continuous pores for drawing in water from the second gas passage by capillary action;
a drainage promoting member formed of a porous material having continuous pores is located downstream of the second gas passage forming member and downstream of the porous layer, and is provided to abut a downstream end of the second gas passage of the second gas passage forming member and to abut a downstream end of the continuous pores of the porous layer, and
water drawn from the second gas passage to the porous layer by capillary action flows downstream by fluid pressure of oxidation gas flowing through the second gas passage and is then drawn in by the continuous pores of the drainage promoting member, and water in the drainage promoting member is discharged into the discharging passage by fluid pressure of oxidation gas that flows from the second gas passage into the continuous pores of the drainage promoting member.

2. The fuel battery according to claim 1, wherein the drainage promoting member is formed integrally of the same material as the porous layer.

3. The fuel battery according to claim 1, wherein one of the following structures is selected: a structure in which the wettability of the continuous pores of the drainage promoting member is set higher than the wettability of the continuous pores of the porous layer; and a structure in which the hydration property of the continuous pores of the drainage promoting member is set higher than the hydration property of the continuous pores of the porous layer.

* * * * *